United States Patent
Bai et al.

(10) Patent No.: US 8,259,410 B1
(45) Date of Patent: Sep. 4, 2012

(54) METHOD AND SYSTEM FOR PROVIDING A MAGNETIC HEAD USING A COMPOSITE MAGNETIC MATERIAL IN THE RECORDING TRANSDUCER

(75) Inventors: Zhigang Bai, Milpitas, CA (US); Suping Song, Fremont, CA (US); Matthew R. Gibbons, San Jose, CA (US); Sining Mao, Fremont, CA (US)

(73) Assignee: Western Digital (Fremont), LLC

( * ) Notice: Subject to any disclaimer, the term of this patent is extended or adjusted under 35 U.S.C. 154(b) by 1139 days.

(21) Appl. No.: 12/126,310

(22) Filed: May 23, 2008

(51) Int. Cl.
*G11B 5/133* (2006.01)

(52) U.S. Cl. ......... 360/125.02; 360/125.03; 360/125.16; 29/603.07

(58) Field of Classification Search ............. 360/123.12, 360/123.37, 123.58, 125.08, 125.24, 125.26, 360/125.28, 128, 319, 125.01–125.75; 29/603.07–603.27
See application file for complete search history.

(56) References Cited

U.S. PATENT DOCUMENTS

| | | | |
|---|---|---|---|
| 5,572,392 A | 11/1996 | Aboaf et al. | |
| 5,703,740 A | 12/1997 | Cohen et al. | |
| 5,995,342 A | 11/1999 | Cohen et al. | |
| 6,034,847 A | 3/2000 | Komuro et al. | |
| 6,134,079 A | 10/2000 | Koshikawa | |
| 6,440,589 B1 | 8/2002 | Fullerton et al. | |
| 6,456,466 B1 | 9/2002 | Nakamoto et al. | |
| 6,562,487 B1 | 5/2003 | Vas'ko et al. | |
| 6,606,225 B1 | 8/2003 | Funayama et al. | |
| 6,643,105 B2 | 11/2003 | Nakamoto et al. | |
| 6,775,108 B2 * | 8/2004 | Kief et al. | 360/319 |
| 7,006,327 B2 | 2/2006 | Krounbi et al. | |
| 7,054,113 B1 | 5/2006 | Seagle et al. | |
| 7,920,358 B2 * | 4/2011 | Jiang et al. | 360/125.17 |
| 2003/0002227 A1 | 1/2003 | Jarratt | |
| 2004/0125501 A1 | 7/2004 | Henze et al. | |
| 2004/0169958 A1 | 9/2004 | Krounbi et al. | |

* cited by examiner

*Primary Examiner* — Allen Heinz (57) ABSTRACT

A method and system for providing a magnetic transducer for recording to media is described. The method and system include providing a first pole, a main pole, at least one coil and at least one auxiliary pole. The main pole is for providing a magnetic field for recording to the media. The coil(s) are for energizing the main pole. The auxiliary pole is magnetically coupled with the main pole. The shield(s) are for magnetically isolating a portion of the magnetic transducer. At least one of the first pole, the auxiliary pole, and the at least one shield includes a composite magnetic material including a plurality of ferromagnetic grains in an insulating matrix.

34 Claims, 8 Drawing Sheets

METHOD AND SYSTEM FOR PROVIDING A MAGNETIC HEAD USING A COMPOSITE MAGNETIC MATERIAL IN THE RECORDING TRANSDUCER

BACKGROUND

Figure 1:
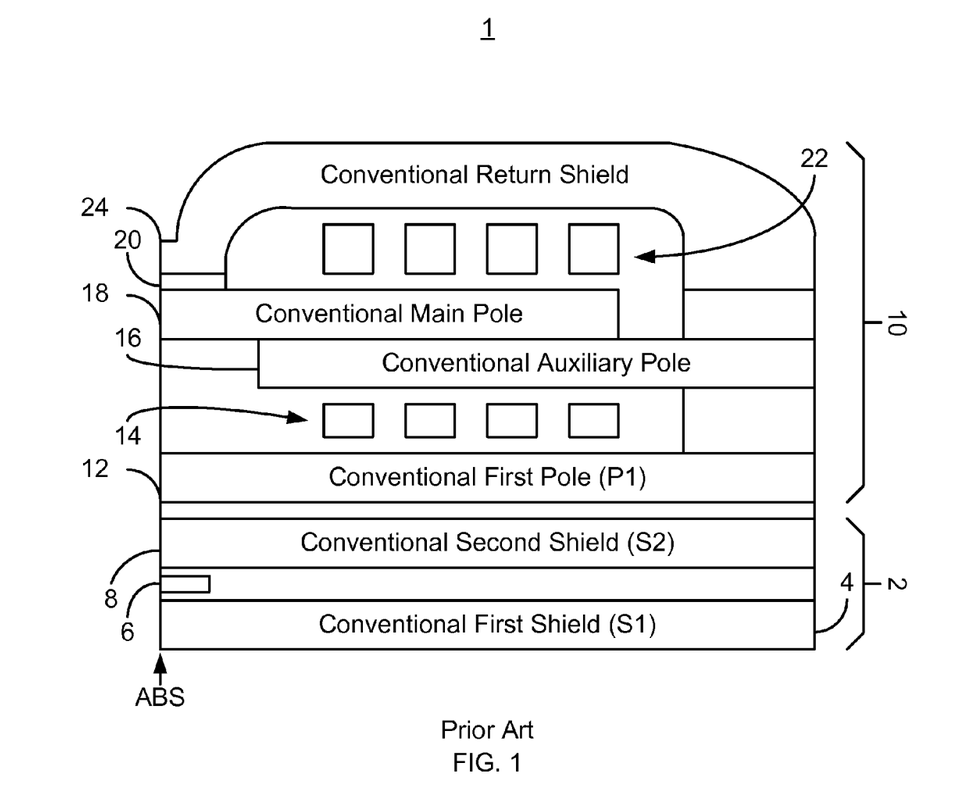
FIG. 1 is a side view of a conventional magnetic recording head.

FIG. 1 depicts a side view of a conventional magnetic recording head 1 used in recording to and reading from a media (not shown). The conventional magnetic recording head 1 may be a perpendicular magnetic recording (PMR) head or a longitudinal magnetic recording head. The conventional head 1 includes a conventional read transducer 2 and a conventional write transducer 10. The conventional read transducer 2 includes shields 4 and 8 and read sensor 6. The conventional write transducer 10 includes a conventional first pole (P1) 12, a first coil 14, conventional auxiliary pole 16, a conventional main pole 18, conventional write gap 20, a conventional second coil 22, and shield 24. The conventional poles 12, 16, and 18 are typically formed of high saturation magnetization, soft magnetic alloys, such as NiFe, CoNiFe, CoFe, and CoFeN. Such high saturation magnetization, soft magnetic alloys are used in order to ensure that sufficient magnetic field is developed for write to the media. The conventional shields 4, 8, and 24 are also typically formed of such magnetic materials. Although the conventional write transducer 10 is depicted with two coils 14 and 22, a single coil may also be used.

In order to write data to a media, the coils 14 and 22 are energized. Consequently, the main pole 18 is magnetized and the media written by flux from the tip of the main pole 18, residing near the air-bearing surface (ABS). Based on the direction of current through the coils 14 and 22, the direction of magnetic flux through the main pole 18 changes. Thus, bits having opposing magnetization can be written and the desired data stored on the media. When the conventional 10 transducer 10 is not writing, no current is driven through the coils 14 and 22.

Although the conventional magnetic recording head 1 functions, the conventional head 1 is desired to be used at higher data rates, for example at two Gbit/second or higher. In such applications, various issues arise. For example, the magnetic recording transducer 10 may have a slower response than desired. In addition, heating of the components of the conventional write transducer 10 may result in increased thermo-mechanical stress in the head. Thermal pole tip protrusion, in which the tip of the conventional main pole 18 protrudes from the ABS, also occurs. Thermal pole tip protrusion may adversely affect reliability of the conventional write transducer 10. Further, the temperature of the read sensor 6 may be increased, which is undesirable.

Accordingly, what is needed is a system and method for improving the high frequency performance of a magnetic recording head.

BRIEF SUMMARY OF THE INVENTION

A method and system for providing a magnetic transducer for recording to media is described. The method and system include providing a first pole, a main pole, at least one coil and at least one auxiliary pole. The main pole is for providing a magnetic field for recording to the media. The coil(s) are for energizing the main pole. The auxiliary pole is magnetically coupled with the main pole. The shield(s) are for magnetically isolating a portion of the magnetic transducer. At least one of the first pole, the auxiliary pole, and the at least one shield includes a composite magnetic material including a plurality of ferromagnetic grains in an insulating matrix.

DETAILED DESCRIPTION OF THE PREFERRED EMBODIMENTS

Figure 2:
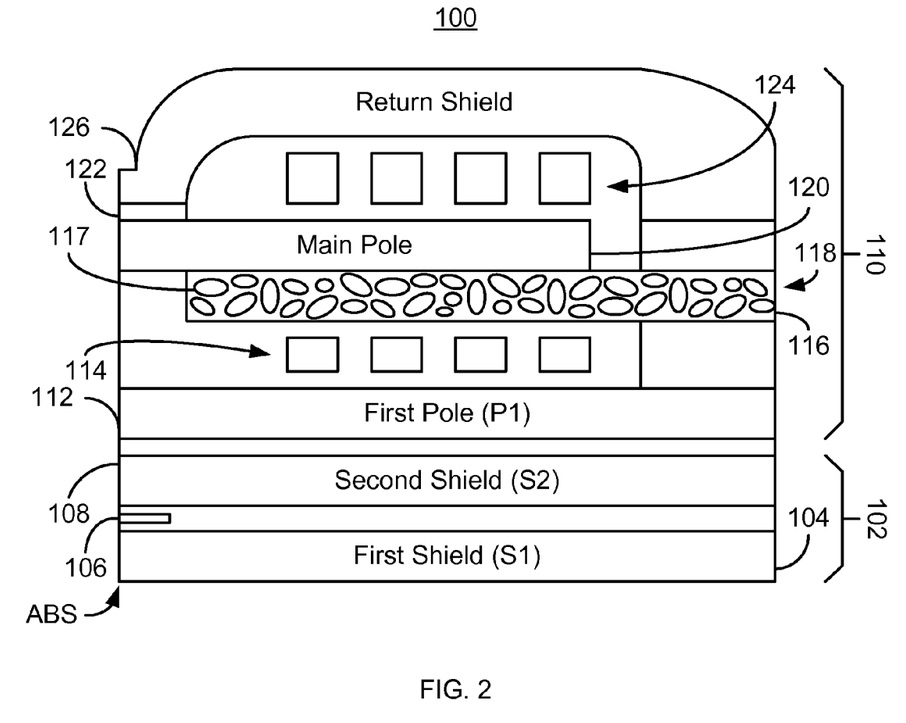
FIG. 2 depicts a side view of an exemplary embodiment of magnetic recording head.

FIG. 2 is a side view of an exemplary embodiment of a magnetic recording head 100. In one embodiment, the magnetic recording head 100 is a PMR head. However, in another embodiment, the magnetic recording head 100 may be a longitudinal magnetic recording head. In addition, although depicted as including both a read transducer 102 and a write transducer 110, the head 100 may include only a write transducer 110. Alternatively, the head 100 may include multiple read and/or write transducers (not shown). For clarity, FIG. 2 is not drawn to scale.

The magnetic recording head 100 includes a read transducer 102 and a write transducer 110. The read transducer 102 includes shields 104 and 108 and read sensor 106. The write transducer 110 includes a first pole (P1) 112, a first coil 114, auxiliary pole 116, a main pole 120, write gap 122, a second coil 124, and shield 126. Although the write transducer 110 is depicted with two coils 114 and 124, a single coil may also be used. In addition, although the auxiliary pole 116 is depicted as below the main pole 120, the auxiliary pole 116 may reside above the main pole 120. In addition, in another embodiment, a second auxiliary pole may be provided. In such an embodiment, the main pole may reside between the auxiliary pole 116 and the second auxiliary pole (not shown in FIG. 2). In one embodiment, the second auxiliary pole may be made of the same material as the auxiliary pole 116. However, in another embodiment, the second auxiliary pole may have a different composition. Further, although the P1 112 is depicted as being separated from S2 108, in one embodiment, these structures may be merged. In addition, a write gap 122 and return shield 126 are shown. However, in one embodiment, these structures are optional. In such an embodiment, the transducer 110 may employ a monopole.

The main pole 120 is used to write to the media (not shown). Because it is used to write to the media, the main pole 120 has a high saturation magnetization and is soft. For example, in one embodiment, the coercivity of the main pole may be less than fifty Oe and the saturation magnetization may be on the order of 1-2 T or more. In another embodiment, the coercivity of the main pole may be not more than twenty Oe. Consequently, the main pole 120 may be a magnetic alloy, such as NiFe, CoNiFe, CoFe, and/or CoFeN. The main pole 120 is energized by the coils 114 and 124. The shields 104, 108, and 126 magnetically isolate the read sensor 106 and the main pole 120. The shield 126 also functions as a return shield into which magnetic flux from the main pole 120 is returned.

The auxiliary pole 116 is magnetically coupled with the main pole 120. In the embodiment shown, the auxiliary pole 116 is a composite material. The composite material includes grains 117 in an insulating matrix 118. The grains 117 are ferromagnetic and, in one embodiment, have a high saturation magnetization. Thus, the grains 117 may include includes at least one of NiFe, CoNiFe, CoFe, and CoFeN. In another embodiment, other magnetic alloys may be used. The magnetic grains 117 may also be characterized by a size. In one embodiment, the size may be the average or mean of the sizes of the grains 117. In another embodiment, this characteristic size of the grains 117 may be a minimum size. Consequently, the grains 117 may have different sizes. In another embodiment, the grains 117 might have substantially the same size. In one embodiment, the grains 117 may have a grain size of at least ten nanometers and not more than one hundred nanometers. In one such embodiment, the grain size is at least ten and not more than fifty nanometers.

The composite material including the insulating matrix 118 and ferromagnetic grains 117 has a high saturation magnetization. However, this saturation magnetization may be less than that of the main pole 120 because the magnetic grains 117 are distributed in a matrix 118 that may be nonmagnetic. Although the saturation magnetization of the auxiliary pole 116 may be reduced, it is still desired to be sufficiently high to ensure that the main pole 120 can write to the media. In one embodiment, the auxiliary pole 116 has a saturation magnetization of not less than one-half Tesla. In one such embodiment, the auxiliary pole 116 has a saturation magnetization of not less than one Tesla. In such embodiments, therefore, the saturation magnetization of the auxiliary pole 116 is still significant.

The auxiliary pole 116 may also have a higher resistivity than the main pole 120. The grains 117 are formed from a material having a resistivity that is generally low. For example, in some embodiments discussed above, the grains 117 are formed from an alloy. In contrast, the matrix 118 is electrically insulating. For example, the matrix 118 may include silicon oxide, aluminum oxide, titanium oxide, magnesium oxide, chromium oxide, and/or zirconium oxide. The composite forming the auxiliary pole 116 may thus have a resistivity that is higher than that of the grains 117 alone, but lower than that of the matrix 118. In one embodiment, the auxiliary pole 116 has a resistivity of at least ten times the resistivity of the material(s) forming the grains 117. For example, in one such embodiment, the composite material of the auxiliary pole 116 is approximately thirty-six percent alumina with CoFe grains 117. Such an embodiment exhibits an elevated resistivity of the auxiliary pole 116, with a saturation magnetization that may exceed one Tesla. In one such embodiment, the saturation magnetization may be 1.4-1.5 T. Although the thickness of the auxiliary pole 116 might vary, in one embodiment, the thickness is of at least 0.3 micron and not more than 1 micron. In one embodiment, the thickness of the auxiliary pole 116 may be adjusted to account for a reduction of saturation magnetization because of the use of magnetic grains 117 in the insulating matrix 118. The auxiliary pole 116 may be made thicker to account for a reduced saturation magnetization due, for example, to a reduction in the concentration of magnetic material in the auxiliary pole 116.

Because the auxiliary pole 116 includes a composite material having grains 117 in an insulating matrix 118, the performance of the magnetic recording head 100 may be improved.

It has been determined that eddy currents a conventional head, such as the head 1 depicted in FIG. 1, adversely affect the high frequency performance of the head. Eddy currents, which increase with increasing data rates, oppose the change of magnetization and thus may slow magnetic flux propagation in a magnetic recording head. A slower rise time may result in poor high frequency performance and reduced data rates. Increased eddy currents may also increase heating of a head. This may result in increased thermo-mechanical stress and pole tip protrusion. Because the resistivity of the auxiliary pole 116 has been increased, eddy currents in the magnetic transducer 110 during writing may be reduced. The reduction in eddy currents may result in a faster response, better high frequency performance, and reduced heating. Thus, issues such as thermo-mechanical stress, pole tip protrusion, and heating of the read sensor 106 may be reduced. This improvement in performance is accomplished without compromising magnetic performance of the head 100. In particular, the saturation magnetization of the auxiliary pole 116 may still be sufficiently high that the auxiliary pole 116 can function as desired. As a result, the main pole 120 may still provide the desired magnetic flux for writing to the medium. Consequently, the write transducer 110, and thus the magnetic head 100 may be able to be used at higher data rates. For example, data rates of two Gbit/second or higher may be achieved.

Figure 3:
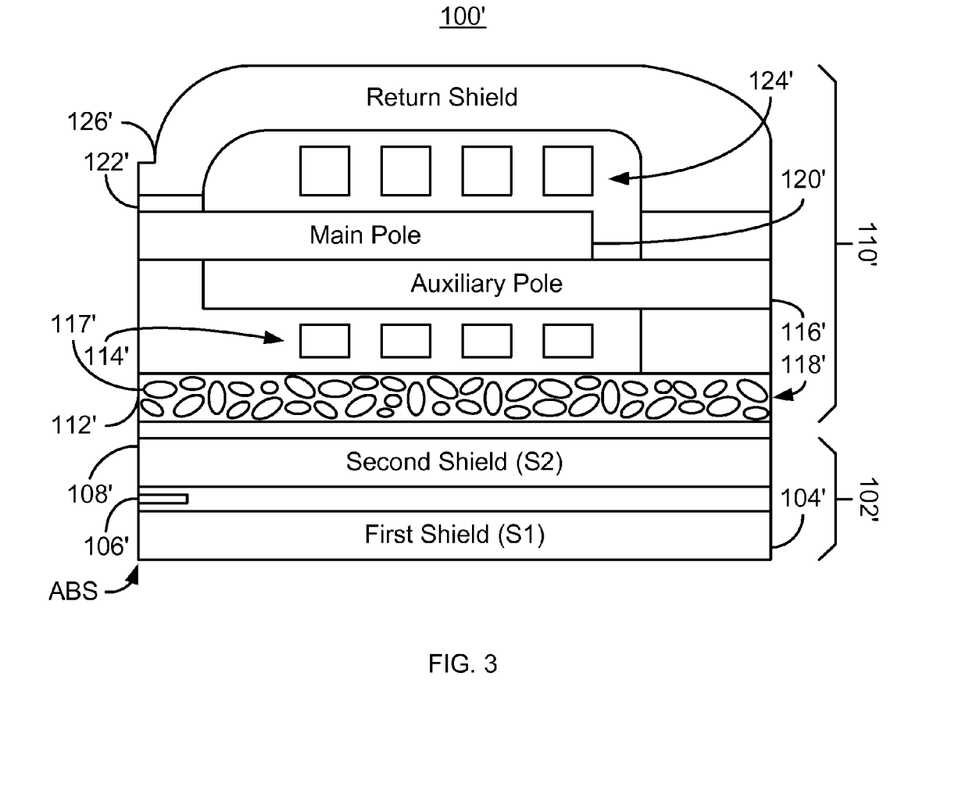
FIG. 3 is a side view of another exemplary embodiment of a magnetic recording head.

FIG. 3 is a side view of another exemplary embodiment 100' of a magnetic recording head. The magnetic recording head 100' is analogous to the magnetic recording head 100. Consequently, analogous components are labeled similarly. In one embodiment, the magnetic recording head 100' is a PMR head. However, in another embodiment, the magnetic recording head 100' may be a longitudinal magnetic recording head. In addition, although depicted as including both a read transducer 102' and a write transducer 110', the head 100' may include only a write transducer 110'. Alternatively, the head 100' may include multiple read and/or write transducers (not shown). For clarity, FIG. 3 is not drawn to scale.

The magnetic recording head 100' includes a read transducer 102' and a write transducer 110'. The read transducer 102' includes shields 104' and 108' and read sensor 106'. The write transducer 110' includes a P1 112', a first coil 114', auxiliary pole 116', a main pole 120', write gap 122', a second coil 124', and shield 126'. Although the write transducer 110' is depicted with two coils 114' and 124', a single coil may also be used. In addition, although the auxiliary pole 116' is depicted as below the main pole 120', the auxiliary pole 116' may reside above the main pole 120'. In addition, in another embodiment, a second auxiliary pole may be provided. In such an embodiment, the main pole may reside between the auxiliary pole 116' and the second auxiliary pole (not shown in FIG. 3). Further, although the P1 112' is depicted as being separated from S2 108', in one embodiment, these structures may be merged. In addition, a write gap 122' and return shield 126' are shown. However, in one embodiment, these structures are optional. In such an embodiment, the transducer 110' may employ a monopole.

The read transducer 102' and write transducer 110' are analogous to the read transducer 102 and write transducer 110, respectively. The main pole 120' is thus used to write to the media (not shown) and has a high saturation magnetization. The coils 114' and 124' energize the main pole 120'. The shields 104', 108', and 126' magnetically isolate the read sensor 106' and the main pole 120'. The shield 126' also functions as a return shield into which magnetic flux from the main pole 120' is returned. In the embodiment shown, the auxiliary pole 116' may be made of an alloy instead of a composite material.

In the embodiment shown, P1 112' includes a composite material having ferromagnetic grains 117' in an insulating matrix 118'. The P1 112' is magnetically coupled with the main pole 120'. The grains 117' are analogous to the grains 117 and thus may be made of the same materials and have the same properties. The insulating matrix 118' is analogous to the insulating matrix 118 and thus may be made of the same materials and have the same properties. The composite material used in the P1 112' is analogous to the composite material used for the auxiliary pole 116 of FIG. 2.

Referring back to FIG. 3, the composite material used for P1 112' has a high saturation magnetization. However, this saturation magnetization may be less than that of the main pole 120' because the magnetic grains 117' are distributed in a matrix 118' that may be nonmagnetic. Although the saturation magnetization of the P1 112' may be reduced, it is still desired to be sufficiently high to ensure that the main pole 120' can write to the media. In one embodiment, the P1 112' has a saturation magnetization of not less than one-half Tesla. In one such embodiment, the P1 112' has a saturation magnetization of not less than one Tesla. In such embodiments, therefore, the saturation magnetization of the P1 112' is still significant.

The P1 112' may have a higher resistivity than the main pole 120'. The grains 117' are formed from a material having a resistivity that is generally low. In contrast, the matrix 118' is electrically insulating. The composite magnetic material forming the P1 112' may thus have a resistivity that is higher than that of the grains 117' alone, but lower than that of the matrix 118'. In one embodiment, the P1 112' has a resistivity of at least ten times the resistivity of the material(s) forming the grains 117'. Although the thickness of the P1 112' might vary, in one embodiment, the thickness is of at least 0.3 micron and not more than 1 micron. In some embodiments, the P1 112' may be made thicker to account for a reduced saturation magnetization due, for example, to a reduction in the concentration of magnetic material in the P1 112'.

Because the P1 112' includes a composite material having grains 117' in an insulating matrix 118', the performance of the magnetic recording head 100' may be improved. As discussed above, it has been determined that eddy currents may adversely affect high frequency operation of the head 100'. Because the resistivity of the P1 112' has been increased, eddy currents in the magnetic transducer 110' during writing may be reduced. The reduction in eddy currents may result in a faster response, better high frequency performance, and reduced heating. Thus, issues such as thermo-mechanical stress, pole tip protrusion, and heating of the read sensor 106' may be reduced. This improvement in performance is accomplished without compromising magnetic performance of the head 100'. In particular, the saturation magnetization of the P1 112' may still be sufficiently high that the P1 112' can function as desired. As a result, the main pole 120' may still provide the desired magnetic flux for writing to the medium. Consequently, the write transducer 110', and thus the magnetic head 100', may be able to be used at higher data rates. For example, data rates of two Gbit/second or higher may be achieved.

Figure 4:
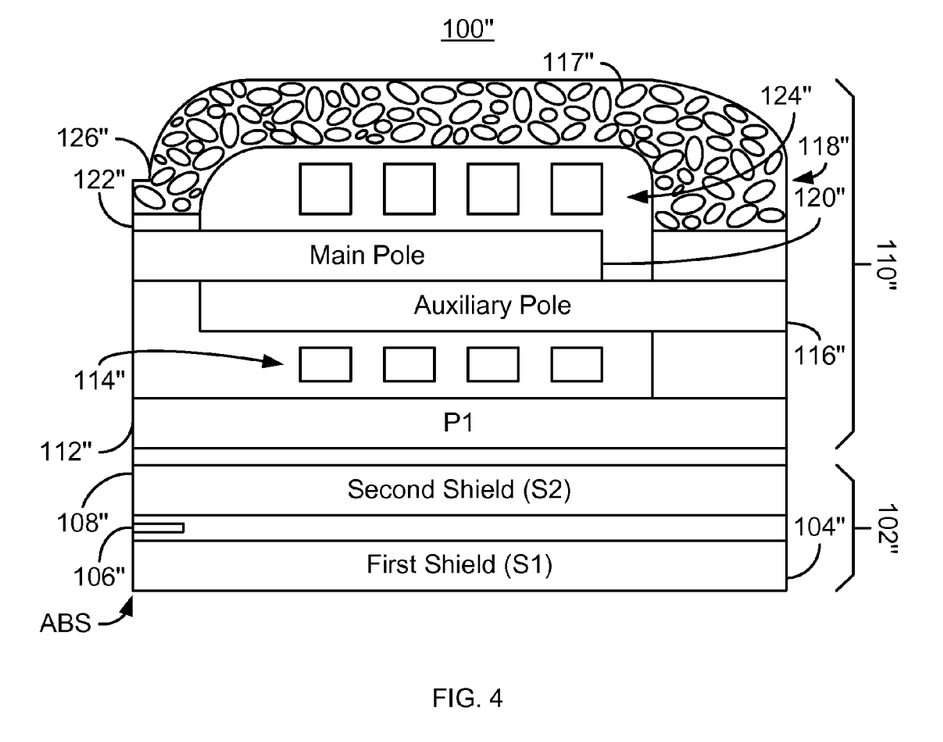
FIG. 4 is a side view of another exemplary embodiment of a magnetic recording head.

FIG. 4 is a side view of another exemplary embodiment 100" of a magnetic recording head. The magnetic recording head 100" is analogous to the magnetic recording heads 100 and 100'. Consequently, analogous components are labeled similarly. In one embodiment, the magnetic recording head 100" is a PMR head. However, in another embodiment, the magnetic recording head 100" may be a longitudinal magnetic recording head. In addition, although depicted as including both a read transducer 102" and a write transducer 110", the head 100" may include only a write transducer 110". Alternatively, the head 100" may include multiple read and/or write transducers (not shown). For clarity, FIG. 4 is not drawn to scale.

The magnetic recording head 100" includes a read transducer 102" and a write transducer 110". The read transducer 102" includes shields 104" and 108" and read sensor 106". The write transducer 110" includes a P1 112", a first coil 114", auxiliary pole 116", a main pole 120", write gap 122", a second coil 124", and shield 126". Although the write transducer 110" is depicted with two coils 114" and 124", a single coil may also be used. In addition, although the auxiliary pole 116" is depicted as below the main pole 120", the auxiliary pole 116" may reside above the main pole 120". In addition, in another embodiment, a second auxiliary pole may be provided. In such an embodiment, the main pole may reside between the auxiliary pole 116" and the second auxiliary pole (not shown in FIG. 4). Further, although the P1 112" is depicted as being separated from S2 108", in one embodiment, these structures may be merged. In addition, a write gap 122" and return shield 126" are shown. However, in one embodiment, these structures are optional. In such an embodiment, the transducer 110" may employ a monopole.

The read transducer 102" and write transducer 110" are analogous to the read transducers 102 and 102' and write transducers 110 and 110', respectively. The main pole 120" is thus used to write to the media (not shown) and has a high saturation magnetization. The coils 114" and 124" energize the main pole 120". The shields 104", 108", and 126" magnetically isolate the read sensor 106" and the main pole 120". The shield 126" also functions as a return shield into which magnetic flux from the main pole 120" is returned. In the embodiment shown, the auxiliary pole 116" and P1 112" may be made of an alloy instead of a composite material.

In the embodiment shown, the shield 126" includes a composite material having ferromagnetic grains 117" in an insulating matrix 118". The shield 126" is magnetically coupled with the main pole 120". The composite material used in the shield 126" is analogous to the composite material used for the auxiliary pole 116 of FIG. 2 and the P1 112' of FIG. 3. The grains 117" are analogous to the grains 117 and 117'. The matrix 118" is analogous to the insulating matrix 118 and 118'. Referring back to FIG. 4, the composite material used for the shield 126" has a high saturation magnetization. However, this saturation magnetization may be less than that of the main pole 120" because the magnetic grains 117" are distributed in a matrix 118" that may be nonmagnetic. Although the saturation magnetization of the shield 126" may be reduced, it is still desired to be sufficiently high to ensure that the main pole 120" can write to the media. The shield 126" may have a higher resistivity than the main pole 120". The grains 117" are formed from a material having a resistivity that is generally low. For example, In contrast, the matrix 118" is electrically insulating. The composite magnetic material forming the shield 126" may thus have a resistivity that is higher than that of the grains 117" alone, but lower than that of the matrix 118". In one embodiment, the shield 126" has a resistivity of at least ten times the resistivity of the material(s) forming the grains 117". In such an embodiment, the shield 126" exhibits an elevated resistivity in addition to a saturation magnetization that may exceed one-half to one Tesla. In one such embodiment, the saturation magnetization may be 1.4-1.5 T. Although the thickness of the shield 126" might vary, in one embodiment, the thickness is of at least 0.3 micron and not more than 1 micron. In some embodiments, the shield 126"

may be made thicker to account for a reduced saturation magnetization due, for example, to a reduction in the concentration of magnetic material in the shield 126".

Because the shield 126" includes a composite material having grains 117" in an insulating matrix 118", the performance of the magnetic recording head 100" may be improved. As discussed above, it has been determined that eddy currents may adversely affect high frequency operation of the head 100". Because the resistivity of the shield 126" has been increased, eddy currents in the magnetic transducer 110" during writing may be reduced. The reduction in eddy currents may result in a faster response, better high frequency performance, and reduced heating. Thus, issues such as thermo-mechanical stress, pole tip protrusion, and heating of the read sensor 106" may be reduced. This improvement in performance is accomplished without compromising magnetic performance of the head 100". In particular, the saturation magnetization of the shield 126" may still be sufficiently high that the shield 126" can function as desired. As a result, the main pole 120" may still provide the desired magnetic flux for writing to the medium. Consequently, the write transducer 110", and thus the magnetic head 100", may be able to be used at higher data rates. For example, data rates of two Gbit/second or higher may be achieved.

Figure 5:
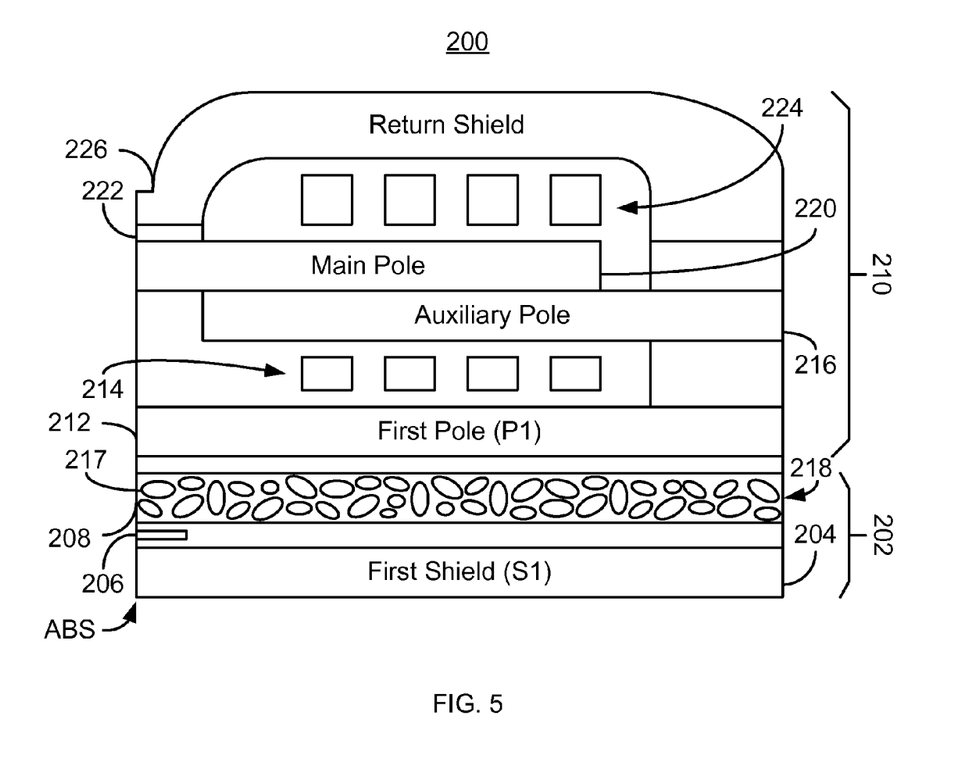
FIG. 5 is a side view of another exemplary embodiment of a magnetic recording head.

FIG. 5 is a side view of another exemplary embodiment 200 of a magnetic recording head. The magnetic recording head 200 is analogous to the magnetic recording heads 100, 100', and 100". Consequently, analogous components are labeled similarly. In one embodiment, the magnetic recording head 200 is a PMR head. However, in another embodiment, the magnetic recording head 200 may be a longitudinal magnetic recording head. In addition, although depicted as including both a read transducer 202 and a write transducer 210, the head 200 may include only a write transducer 210. Alternatively, the head 200 may include multiple read and/or write transducers (not shown). For clarity, FIG. 5 is not drawn to scale.

The magnetic recording head 200 includes a read transducer 202 and a write transducer 210. The read transducer 202 includes shields 204 and 208 and read sensor 206. The write transducer 210 includes a P1 212, a first coil 214, auxiliary pole 216, a main pole 220, write gap 222, a second coil 224, and shield 226. Although the write transducer 210 is depicted with two coils 214 and 224, a single coil may also be used. In addition, although the auxiliary pole 216 is depicted as below the main pole 220, the auxiliary pole 216 may reside above the main pole 220. In addition, in another embodiment, a second auxiliary pole may be provided. In such an embodiment, the main pole may reside between the auxiliary pole 216 and the second auxiliary pole (not shown in FIG. 5). Further, although the P1 212 is depicted as being separated from S2 208, in one embodiment, these structures may be merged. In addition, a write gap 222 and return shield 226 are shown. However, in one embodiment, these structures are optional. In such an embodiment, the transducer 210 may employ a monopole.

The read transducer 202 and write transducer 210 are analogous to the read transducers 102, 102', and 102" and write transducers 110, 110', and 110", respectively. The main pole 220 is thus used to write to the media (not shown) and has a high saturation magnetization. The coils 214 and 224 energize the main pole 220. The shields 204, 208, and 226 magnetically isolate the read sensor 206 and the main pole 220. The shield 226 also functions as a return shield into which magnetic flux from the main pole 220 is returned. In the embodiment shown, the auxiliary pole 216 and P1 212 may be made of an alloy instead of a composite material.

In the embodiment shown, the shield 208 includes a composite material having magnetic grains 217 in an insulating matrix 218. The grains 217 are analogous to the grains 117, 117', and 117". The grains 217 may, therefore, have a high saturation magnetization. Thus, the grains 217 may include includes at least one of NiFe, CoNiFe, CoFe, and CoFeN. In another embodiment, other magnetic alloys may be used. The magnetic grains 217 may also be characterized by a size. In one embodiment, the size may be the average or mean of the sizes of the grains 217. In another embodiment, this characteristic size of the grains 217 may be a minimum size. Consequently, the grains 217 may have different sizes. In another embodiment, the grains 217 might have substantially the same size. In one embodiment, the grains 217 may have a grain size of at least ten nanometers and not more than one hundred nanometers. In one such embodiment, the grain size is not more than fifty nanometers.

The composite material used in the shield 208 is analogous to the composite material used for the auxiliary pole 116 of FIG. 2, the P1 112' of FIG. 3, and the return shield 126" of FIG. 4. Referring back to FIG. 5, the composite material used for the shield 208 has a high saturation magnetization. However, this saturation magnetization may be less than that of the main pole 220 because the magnetic grains 217 are distributed in a matrix 218 that may be nonmagnetic. Because the shield 208 is a reader shield, the moment requirements may be relaxed. In one embodiment, the shield 208 has a saturation magnetization of not less than one-half Tesla. In one such embodiment, the shield 208 has a saturation magnetization of not less than one Tesla.

The shield 208 may have a higher resistivity than the main pole 220 for the reasons described above. In particular, the grains 217 are formed from a material having a resistivity that is generally low. For example, in some embodiments discussed above, the grains 217 are formed from an alloy. In contrast, the matrix 218 is electrically insulating and may include silicon oxide, aluminum oxide, titanium oxide, magnesium oxide, chromium oxide, and/or zirconium oxide. The composite magnetic material forming the shield 208 may thus have a resistivity that is higher than that of the grains 217 alone, but lower than that of the matrix 218. In one embodiment, the shield 208 has a resistivity of at least ten times the resistivity of the material(s) forming the grains 217. For example, in one such embodiment, the composite material of the shield 208 is approximately thirty-six percent alumina with CoFe grains 217. In such an embodiment, the shield 208 exhibits an elevated resistivity in addition to a saturation magnetization that may exceed one-half to one Tesla. Although the thickness of the shield 208 might vary, in one embodiment, the thickness is of at least 0.3 micron and not more than 1 micron. In some embodiments, the shield 208 may be made thicker to account for a reduced saturation magnetization due, for example, to a reduction in the concentration of magnetic material in the shield 208.

Because the shield 208 includes a composite material having grains 217 in an insulating matrix 218, the performance of the magnetic recording head 200 may be improved. As discussed above, it has been determined that eddy currents may adversely affect high frequency operation of the head 200. Because the resistivity of the shield 208 has been increased, eddy currents in the magnetic transducer 210 during writing may be reduced. The reduction in eddy currents may result in a faster response, better high frequency performance, and reduced heating. Thus, issues such as thermo-mechanical stress, pole tip protrusion, and heating of the read sensor 206 may be reduced. This improvement in performance is accomplished without compromising magnetic performance of the head 200. Consequently, the write transducer 210, and thus the magnetic head 200, may be able to be used at higher data rates. For example, data rates of two Gbit/second or higher may be achieved. However, benefits due to the reduction of eddy currents may be reduced for the magnetic head 200 as compared to the magnetic heads 100, 100', and 100". This is because the shield 208 including the composite material is farther from the changing magnetic flux being driven by the coil(s) 214 and 224. Thus, a decrease in eddy currents in the entire head 100, 100', 100" and 200 is expected to be greater for the heads 100, 100', and 100" than for the head 200. However, some benefits may still be achieved. For example, the composite material in the shield 208 is expected to have a reduced coefficient of thermal expansion. As a result, a reduction in thermal pole tip protrusion may still be expected.

Figure 6:
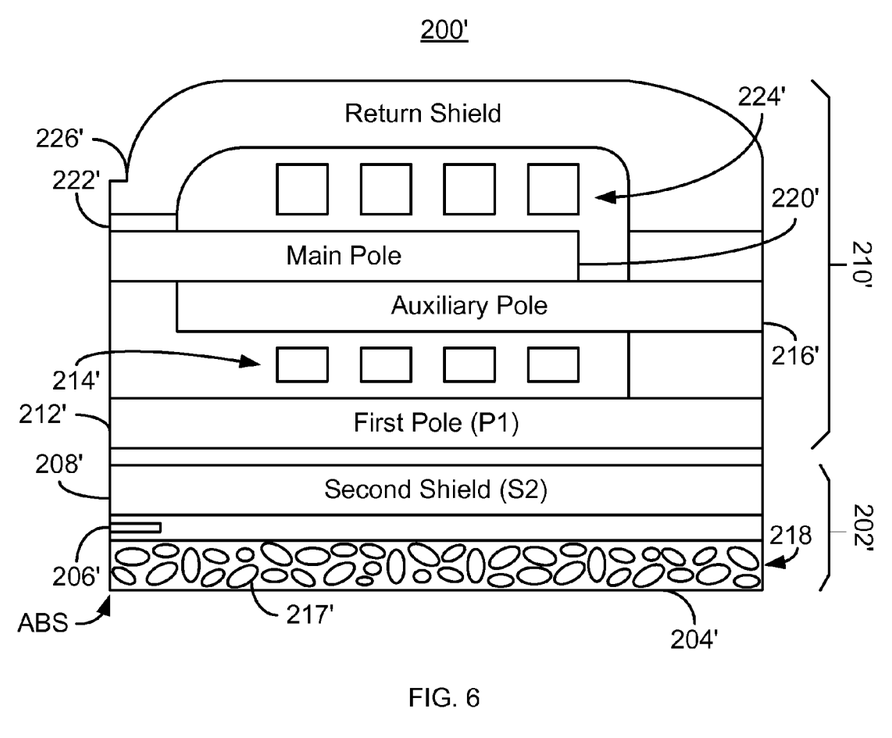
FIG. 6 is a side view of another exemplary embodiment of a magnetic recording head.

FIG. 6 is a side view of another exemplary embodiment of a magnetic recording head 200'. The magnetic recording head 200' is analogous to the magnetic recording heads 100, 100', 100", and 200. Consequently, analogous components are labeled similarly. In one embodiment, the magnetic recording head 200' is a PMR head. However, in another embodiment, the magnetic recording head 200' may be a longitudinal magnetic recording head. In addition, although depicted as including both a read transducer 202' and a write transducer 210', the head 200' may include only a write transducer 210'. Alternatively, the head 200' may include multiple read and/or write transducers (not shown). For clarity, FIG. 6 is not drawn to scale.

The magnetic recording head 200' includes a read transducer 202' and a write transducer 210'. The read transducer 202' includes shields 204' and 208' and read sensor 206'. The write transducer 210' includes a P1 212', a first coil 214', auxiliary pole 216', a main pole 220', write gap 222', a second coil 224', and shield 226'. Although the write transducer 210' is depicted with two coils 214' and 224', a single coil may also be used. In addition, although the auxiliary pole 216' is depicted as below the main pole 220', the auxiliary pole 216' may reside above the main pole 220'. In addition, in another embodiment, a second auxiliary pole may be provided. In such an embodiment, the main pole may reside between the auxiliary pole 216' and the second auxiliary pole (not shown in FIG. 6). Further, although the P1 212' is depicted as being separated from S2 208', in one embodiment, these structures may be merged. In addition, a write gap 222' and return shield 226' are shown. However, in one embodiment, these structures are optional. In such an embodiment, the transducer 210' may employ a monopole.

The read transducer 202' and write transducer 210' are analogous to the read transducers 102, 102', 102", and 202 and to write transducers 110, 110', 110", and 210, respectively. The main pole 220' is thus used to write to the media (not shown) and has a high saturation magnetization. The coils 214' and 224' energize the main pole 220'. The shields 204', 208', and 226' magnetically isolate the read sensor 206' and the main pole 220'. The shield 226' also functions as a return shield into which magnetic flux from the main pole 220' is returned. In the embodiment shown, the auxiliary pole 216' and P1 212' may be made of an alloy instead of a composite material.

In the embodiment shown, the shield 204' includes a composite material having magnetic grains 217' in an insulating matrix 218'. The grains 217' are analogous to the grains 117, 117', 117", and 217. The grains 217' may, therefore, have substantially the same properties and composition as the grains 117, 117', 117", and/or 217. The composite material used in the shield 204' is analogous to the composite material used for the auxiliary pole 116 of FIG. 2, the P1 112' of FIG. 3, the return shield 126" of FIG. 4, and the shield 208 of FIG. 5. Referring back to FIG. 6, the composite material used for the shield 204' has substantially the same composition and performance as the shield 202'. Although the thickness of the shield 204' might vary, in one embodiment, the thickness is of at least 0.3 micron and not more than 1 micron. In some embodiments, the shield 204' may be made thicker to account for a reduced saturation magnetization due, for example, to a reduction in the concentration of magnetic material in the shield 204.

Because the shield 204' includes a composite material having grains 217' in an insulating matrix 218', the performance of the magnetic recording head 200' may be improved. As discussed above, it has been determined that eddy currents may adversely affect high frequency operation of the head 200'. Because the resistivity of the shield 204' has been increased, eddy currents in the magnetic transducer 210' during writing may be reduced. The reduction in eddy currents may result in a faster response, better high frequency performance, and reduced heating. Thus, issues such as thermomechanical stress, pole tip protrusion, and heating of the read sensor 206' may be reduced. This improvement in performance is accomplished without compromising magnetic performance of the head 200'. In addition, because the shield 204' is a reader shield, the magnetic moment requirements may be relaxed. Consequently, the write transducer 210', and thus the magnetic head 200', may be able to be used at higher data rates. For example, data rates of two Gbit/second or higher may be achieved. However, benefits due to the reduction of eddy currents may be reduced for the magnetic head 200' as compared to the magnetic heads 100, 100', 100", and 200. This is because the shield 204' including the composite material is farther from the changing magnetic flux being driven by the coil(s) 214' and 224'. Thus, a decrease in eddy currents in the entire head 100, 100', 100", 200, and 200' is expected to be greater for the heads 100, 100', 100" and 200 than for the head 200'. However, some benefits may still be achieved. For example, the composite material in the shield 204' is expected to have a reduced coefficient of thermal expansion. As a result, a reduction in thermal pole tip protrusion may still be expected.

Figure 7:
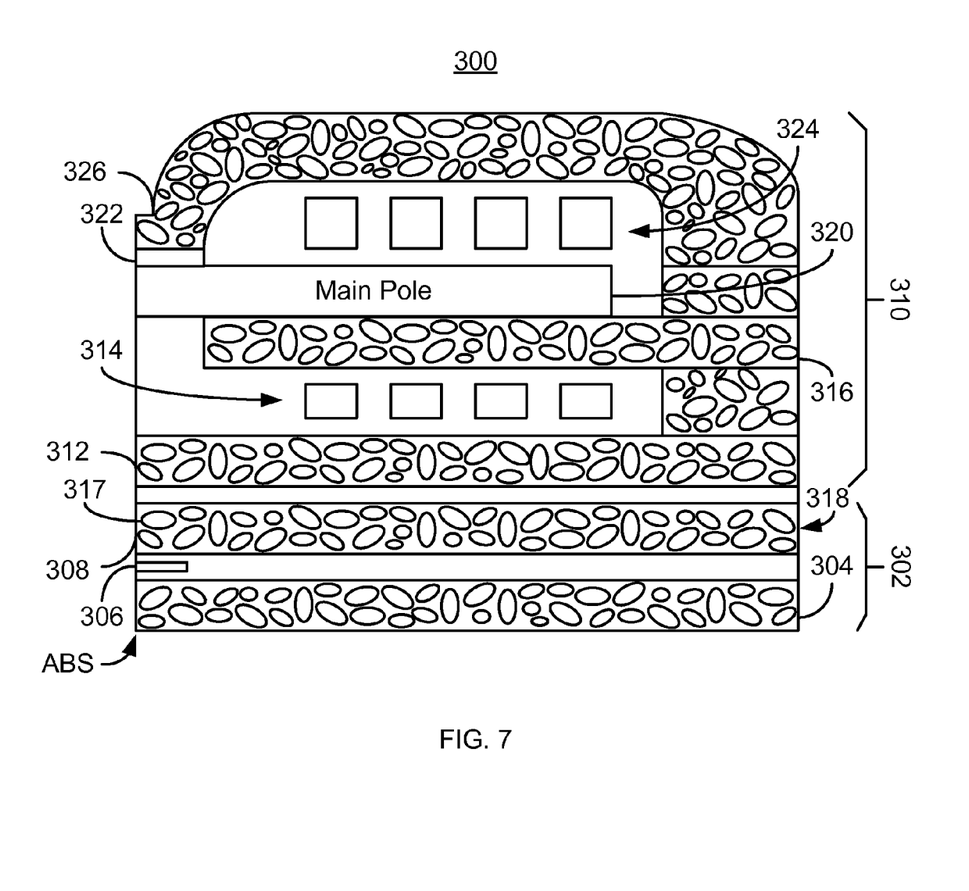
FIG. 7 is a side view of another exemplary embodiment of a magnetic recording head.

Thus, FIGS. 2-6 depicts various portions of the magnetic heads 100, 100', 100", 200, and 200' being formed from a composite material including ferromagnetic grains 117, 117', 117", 217, and 217', respectively, in an insulating matrix 118, 118', 118", 218, and 218', respectively. In the heads 100, 100', 100", 200, and 200' only one structure 116, 112', 126", 208, and 204' is depicted as including the composite material. However, any combination of these structures may be formed using the composite material. For example, FIG. 7 is a side view of another exemplary embodiment of a magnetic recording head 300. The magnetic recording head 300 is analogous to the magnetic recording heads 100, 100', 100", 200, and 200'. Consequently, analogous components are labeled similarly. In one embodiment, the magnetic recording head 300 is a PMR head. However, in another embodiment, the magnetic recording head 300 may be a longitudinal magnetic recording head. In addition, although depicted as including both a read transducer 302 and a write transducer 310, the head 300 may include only a write transducer 310. Alternatively, the head 300 may include multiple read and/or write transducers (not shown). For clarity, FIG. 7 is not drawn to scale.

The magnetic recording head 300 includes a read transducer 302 and a write transducer 310. The read transducer 302 includes shields 304 and 308 and read sensor 306. The write transducer 310 includes a P1 312, a first coil 314, auxiliary pole 316, a main pole 320, write gap 322, a second coil 324, and shield 326. Although the write transducer 310 is depicted with two coils 314 and 324, a single coil may also be used. In addition, although the auxiliary pole 316 is depicted as below the main pole 320, the auxiliary pole 316 may reside above the main pole 320. In addition, in another embodiment, a second auxiliary pole may be provided. In such an embodiment, the main pole may reside between the auxiliary pole 316 and the second auxiliary pole (not shown in FIG. 7). Further, although the P1 312 is depicted as being separated from S2 308, in one embodiment, these structures may be merged. In addition, a write gap 322 and return shield 326 are shown. However, in one embodiment, these structures are optional. In such an embodiment, the transducer 310 may employ a monopole.

The read transducer 302 and write transducer 310 are analogous to the read transducers 102, 102', 102", 202, and 202' and to write transducers 110, 110', 110", 210, and 210', respectively. The main pole 320 is thus used to write to the media (not shown) and has a high saturation magnetization. The coils 314 and 324 energize the main pole 320. The shields 304, 308, and 326 magnetically isolate the read sensor 306 and the main pole 320. The shield 326 also functions as a return shield into which magnetic flux from the main pole 320 is returned. In the embodiment shown, the auxiliary pole 316 and P1 312 may be made of an alloy instead of a composite material.

In the embodiment shown, essentially all ferromagnetic components except for the main pole 320 include a composite material having ferromagnetic grains 317 in an insulating matrix 318. Thus, the shields 304, 308, and 326, the poles 312 and 316, as well as other portions of the head 300 are formed of the composite material. The composite material is analogous to that used in the heads 100, 100', 100", 200, and 200'. Although the components 304, 308, 312, 316, and 326 are all depicted as being composed of the composite material, in one embodiment, any combination of the components 304, 308, 312, 316, and/or 326 may be composed of the composite material.

Because the components 304, 308, 312, 316, and/or 326 includes a composite material having grains 317 in an insulating matrix 318, the performance of the magnetic recording head 300 may be improved. As discussed above, it has been determined that eddy currents may adversely affect high frequency operation of the head 300. Because the resistivity of the components 304, 308, 312, 316, and/or 326 has been increased, eddy currents in the magnetic transducer 310 during writing may be reduced. The reduction in eddy currents may result in a faster response, better high frequency performance, and reduced heating. Thus, issues such as thermomechanical stress, pole tip protrusion, and heating of the read sensor 306 may be reduced. This improvement in performance is accomplished without compromising magnetic performance of the head 300. Consequently, the write transducer 310, and thus the magnetic head 300, may be able to be used at higher data rates.

Figure 8:
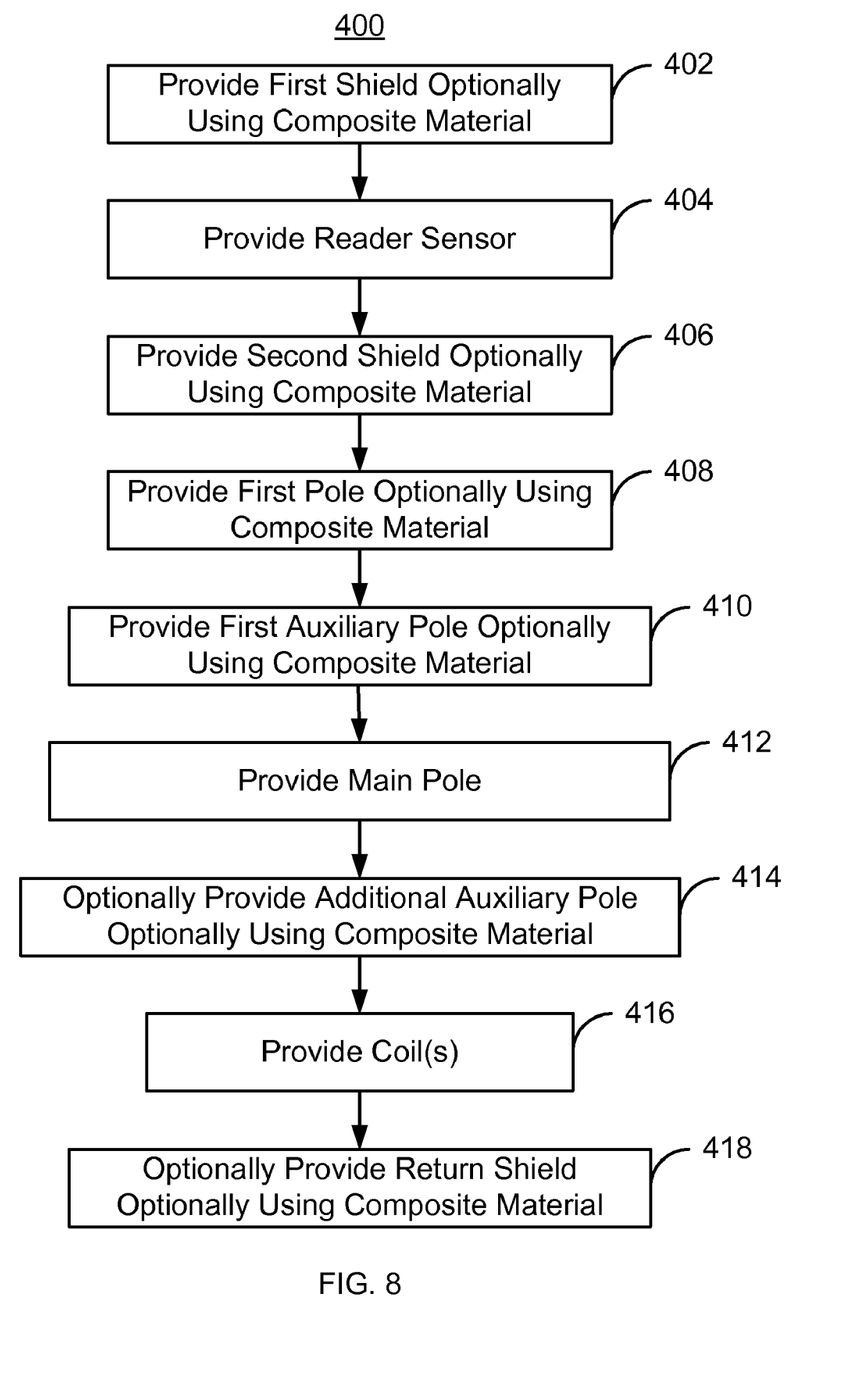
FIG. 8 is a flow chart depicting an exemplary embodiment of a method for fabricating a magnetic recording head.

FIG. 8 is a flow chart depicting an exemplary embodiment of a method 400 for fabricating a magnetic recording head. For clarity, the method 400 is described in the context of the magnetic recording head 300. However, the method 400 may be used with other heads, for example, the heads 100, 100', 100', 200, and/or 200'. For simplicity, some steps may be omitted. The method 400 also may commence after formation of other portions of the magnetic recording head 300. The method 400 is also described in the context of providing a single recording transducer. However, the method 400 may be used to fabricate multiple transducers at substantially the same time.

A first shield 304 is provided, via step 402. In one embodiment, step 402 may include forming the first shield 304 of a composite material including grains 317 in an insulating matrix 318. In another embodiment, step 402 may include forming the first shield 304 from an alloy. The read sensor 306 may also be provided, via step 404. The second shield 308 may be provided, via step 406. In one embodiment, step 406 may include forming the second shield 308 of a composite material including grains 317 in an insulating matrix 318. In another embodiment, step 406 may include forming the second shield 308 from an alloy.

The P1 312 may be provided, via step 408. In one embodiment, step 408 may include forming the P1 312 of a composite material including grains 317 in an insulating matrix 318. In another embodiment, step 408 may include forming the P1 312 from an alloy. An auxiliary pole 316 may be provided, via step 410. In one embodiment, this step may be omitted and the auxiliary pole provided on the main pole 320. In one embodiment, step 410 may include forming the first auxiliary pole 316 of a composite material including grains 317 in an insulating matrix 318. In another embodiment, step 410 may include forming the auxiliary pole 316 from an alloy.

The main pole 320 is provided, via step 412. In one embodiment, step 412 includes providing the main pole 320 from a high saturation magnetization alloy. Another auxiliary pole may be optionally provided, via step 414. In one embodiment, step 414 may be omitted. In one embodiment, step 414 may include forming the auxiliary pole of a composite material including grains 317 in an insulating matrix 318. In another embodiment, step 414 may include forming the auxiliary pole from an alloy. The coil(s) 314 and/or 324 may be provided, via step 416. Note that at least a portion of step 416 may be carried out before steps 410 and 412. A return shield 326 may optionally be provided, via step 418. In one embodiment, the return shield 326 may include the composite material. However, in another embodiment, the return shield 326 may be composed of an alloy. Fabrication of the magnetic head 300 may then be completed.

Using the method 400, the magnetic recording heads 100, 100', 100", 200, 200', and/or 300 may be provided. Thus, the benefits of the magnetic recording heads 100, 100', 100", 200, 200', and/or 300 may be achieved.

We claim:

1. A magnetic transducer for recording to a media, the magnetic transducer comprising:
   a first pole;
   a main pole for providing a magnetic field for recording to the media;
   at least one coil for energizing the main pole; and
   at least one of an auxiliary pole magnetically coupled with the main pole and at least one shield for magnetically isolating a portion of the magnetic transducer;
   wherein at least one of the first pole and the auxiliary pole includes a composite magnetic material including a plurality of ferromagnetic grains in an insulating matrix.

2. The magnetic transducer of claim 1 wherein the plurality of magnetic grains includes at least one of NiFe, CoNiFe, CoFe, and CoFeN.

3. The magnetic transducer of claim 1 wherein the insulating matrix includes at least one of silicon oxide, aluminum oxide, titanium oxide, magnesium oxide, chromium oxide, and zirconium oxide.

4. The magnetic transducer of claim 1 wherein at least a portion of the plurality of magnetic grains have a grain size of at least ten nanometers and not more than one hundred nanometers.

5. The magnetic transducer of claim 4 wherein the size is not more than fifty nanometers.

6. The magnetic transducer of claim 1 wherein the composite magnetic material has a saturation magnetization of not less than one-half Tesla.

7. The magnetic transducer of claim 6 wherein the composite magnetic material has a saturation magnetization of not less than one Tesla.

8. The magnetic transducer of claim 1 wherein the plurality of ferromagnetic grains include an alloy having an alloy resistivity, the composite magnetic material having a resistivity of at least ten times the alloy resistivity.

9. The magnetic transducer of claim 1 further comprising:
a write gap adjacent to the main pole; and
wherein the at least one shield includes a return shield, the write gap residing between a portion of the return shield and the main pole.

10. The magnetic transducer of claim 1 wherein the at least one shield includes the composite magnetic material.

11. The magnetic transducer of claim 1 wherein the at least one shield includes a first shield, the first pole residing between the first shield and the main pole, the first shield including the composite magnetic material.

12. A magnetic transducer for recording to a media, the magnetic transducer being in proximity to a read transducer including a read sensor and a first shield, the magnetic transducer comprising:
a second shield, the read sensor residing between the first shield and the second shield;
a main pole for providing a magnetic field for recording to the media, the second shield residing between the read sensor and the main pole;
a first pole;
an auxiliary pole, the auxiliary pole being magnetically coupled with the main pole;
at least one coil, the at least one coil for energizing the main pole;
write gap adjacent to the main pole;
a return shield, the main pole, the auxiliary pole, the first pole, and the at least one coil residing between the first shield and the return shield and between the second shield and the return shield;
wherein at least one of the first pole, the auxiliary pole and the return shield includes a composite magnetic material including a plurality of ferromagnetic grains in an insulating matrix, the composite magnetic material having a saturation magnetization of at least one Tesla, wherein the plurality of ferromagnetic grains include an alloy having an alloy resistivity, and
wherein the composite magnetic material has a resistivity of at least ten times the alloy resistivity.

13. A magnetic head comprising:
a read transducer including a read sensor and a first shield;
a write transducer including a first pole, an auxiliary pole, a main pole, at least one coil, a write gap adjacent to the main pole, a second shield, and a return shield, the main pole, the auxiliary pole, the first pole, and the at least one coil residing between the second shield and the return shield, the read sensor residing between the first shield and the second shield, the main pole for providing a magnetic field for recording to the media, the auxiliary pole being magnetically coupled with the main pole, the at least one coil for energizing the main pole;
wherein at least one of the first pole, the auxiliary pole, and the return shield includes a composite magnetic material including a plurality of ferromagnetic grains in an insulating matrix.

14. The magnetic head of claim 13 wherein the plurality of magnetic grains includes at least one of NiFe, CoNiFe, CoFe, and CoFeN.

15. The magnetic head of claim 13 wherein the insulating matrix includes at least one of silicon oxide, aluminum oxide, titanium oxide, magnesium oxide, chromium oxide, and zirconium oxide.

16. The magnetic head of claim 13 wherein at least a portion of the plurality of magnetic grains have a grain size of at least ten nanometers and not more than one hundred nanometers.

17. The magnetic head of claim 16 wherein the size is not more than fifty nanometers.

18. The magnetic head of claim 13 wherein the composite magnetic materials has a saturation magnetization of not less than one-half Tesla.

19. The magnetic head of claim 18 wherein the saturation magnetization is not less than one Tesla.

20. The magnetic head of claim 13 wherein the plurality of ferromagnetic grains include an alloy having an alloy resistivity, the composite magnetic material having a resistivity of at least ten times the alloy resistivity.

21. A disk drive including a magnetic recording head comprising:
a read transducer including a read sensor and a first shield;
a write transducer including a first pole, an auxiliary pole, a main pole, at least one coil, a write gap adjacent to the main pole, a second shield, and a return shield, the read sensor residing between the first shield and the second shield, the main pole for providing a magnetic field for recording to the media, the auxiliary pole being magnetically coupled with the main pole, the at least one coil for energizing the main pole, the main pole, the auxiliary pole, the first pole, and the at least one coil residing between the first shield and the return shield and between the second shield and the return shield;
wherein at least one of the first pole, the auxiliary pole, and the return shield includes a composite magnetic material including a plurality of ferromagnetic grains in an insulating matrix.

22. A method for providing a magnetic transducer for recording to media, the method comprising:
providing a first pole;
providing a main pole for providing a magnetic field for recording to the media;
providing an auxiliary pole magnetically coupled with the main pole;
providing at least one coil for energizing the main pole; and
providing at least one shield for magnetically isolating a portion of the magnetic transducer;
wherein at least one of the steps of providing the pole and providing the auxiliary pole includes providing a composite magnetic material including a plurality of ferromagnetic grains in an insulating matrix.

23. The method of claim 22 wherein the plurality of magnetic grains includes at least one of NiFe, CoNiFe, CoFe, and CoFeN.

24. The method of claim 22 wherein the insulating matrix includes at least one of silicon oxide, aluminum oxide, titanium oxide, magnesium oxide, chromium oxide, and zirconium oxide.

25. The method of claim 22 wherein at least a portion of the plurality of magnetic grains have a grain size of at least ten nanometers and not more than one hundred nanometers.

26. The method of claim 25 wherein the grain size is not more than fifty nanometers.

27. The method of claim 22 wherein the composite magnetic material has a saturation magnetization of not less than one-half Tesla.

28. The method of claim 27 wherein the saturation magnetization is not less than one Tesla.

29. The method of claim 22 wherein the plurality of ferromagnetic grains include an alloy having an alloy resistivity, the composite magnetic material having a resistivity of at least ten times the alloy resistivity.

30. The method of claim 22 wherein the at least one shield further includes a return shield, the write gap residing between a portion of the return shield and the portion of the main pole, the return shield including the composite magnetic material.

31. The method of claim 22 wherein the at least one shield includes a first shield, the first pole residing between the first shield and the main pole, the first shield including the composite magnetic material.

32. The method of claim 22 wherein the step of providing the composite magnetic material further includes:

sputtering at least one of a magnetic material for the plurality of magnetic grains and an insulator for the insulating matrix.

33. The method of claim 32 wherein the step of providing the composite magnetic material further includes co-sputtering the magnetic material and the insulator.

34. The method of claim 32 wherein the step of providing the composite magnetic material further includes:

performing an anneal.

* * * * *